INVENTOR.
CHARLES E. EVERETT
BY
ATTORNEY

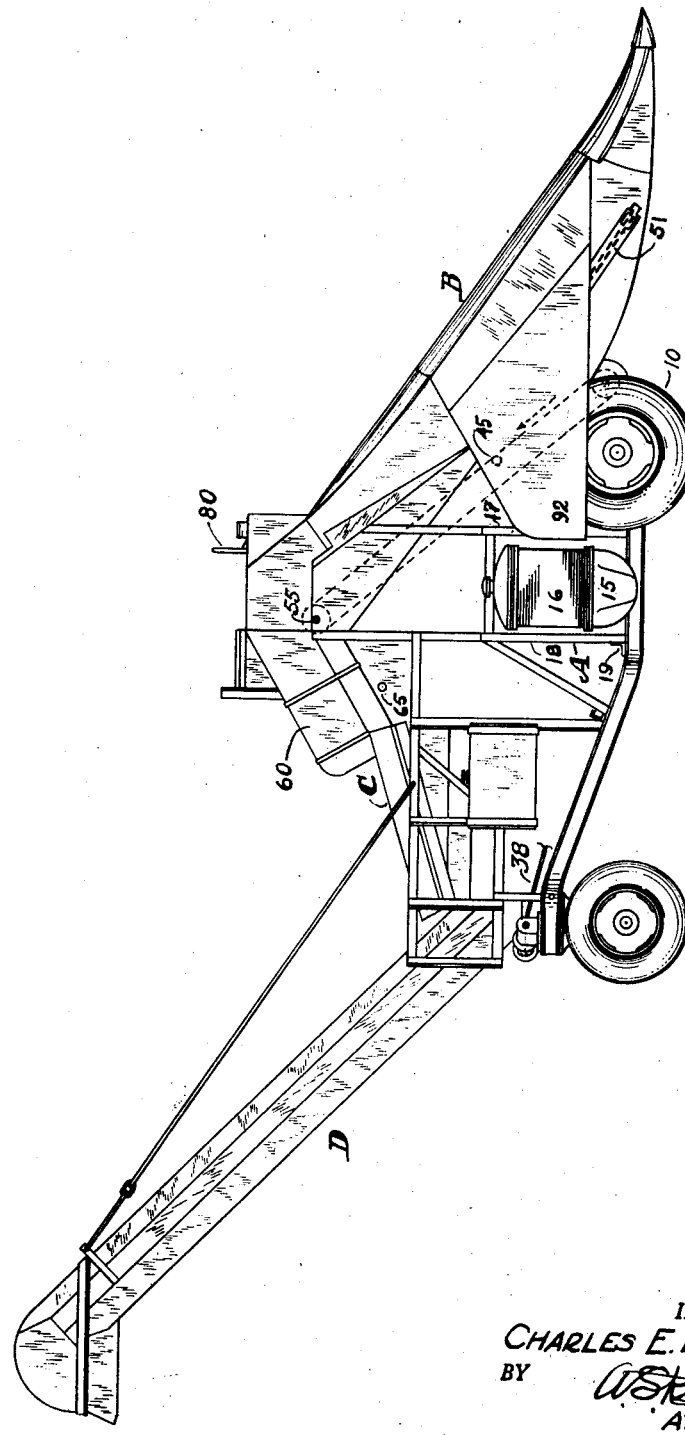

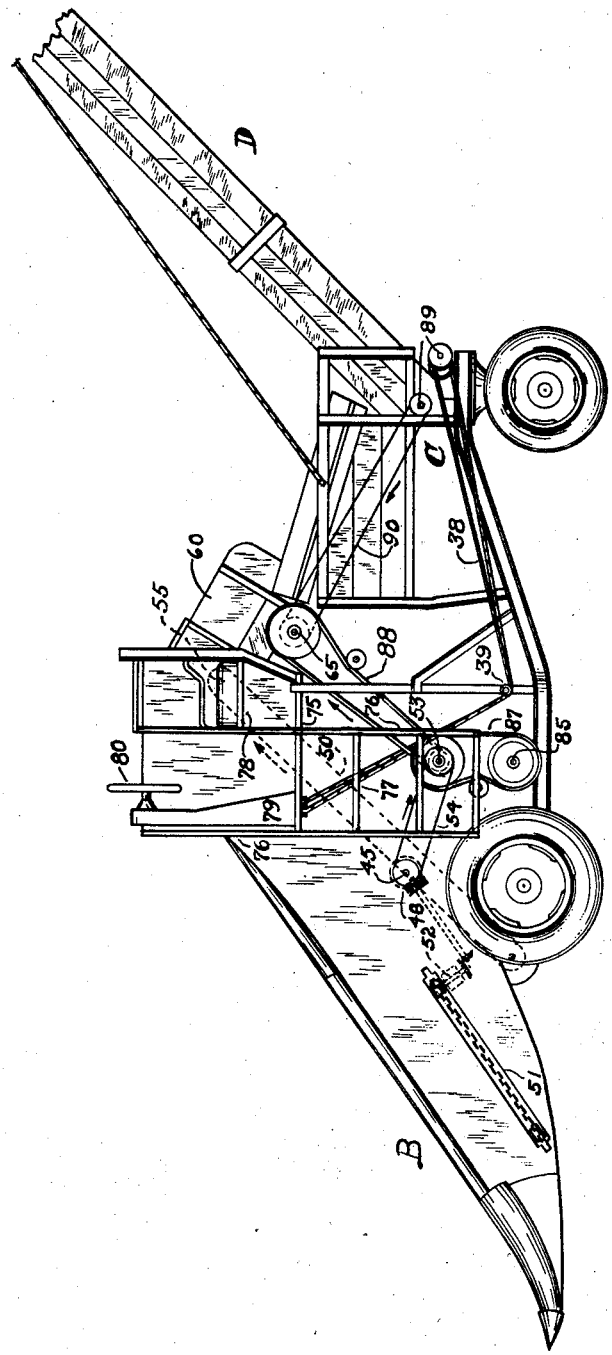

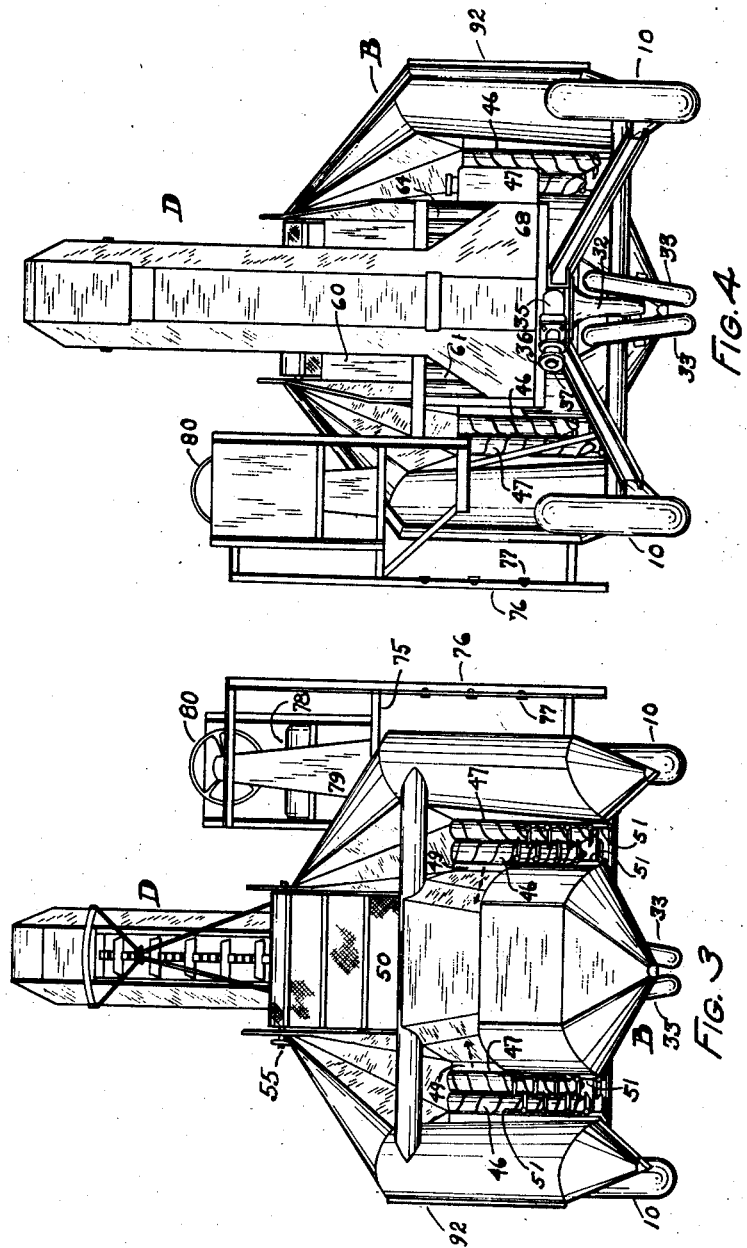

June 29, 1943.　　　C. E. EVERETT　　　2,323,087
SELF PROPELLED CORN HARVESTER
Filed Aug. 14, 1942　　　5 Sheets-Sheet 5
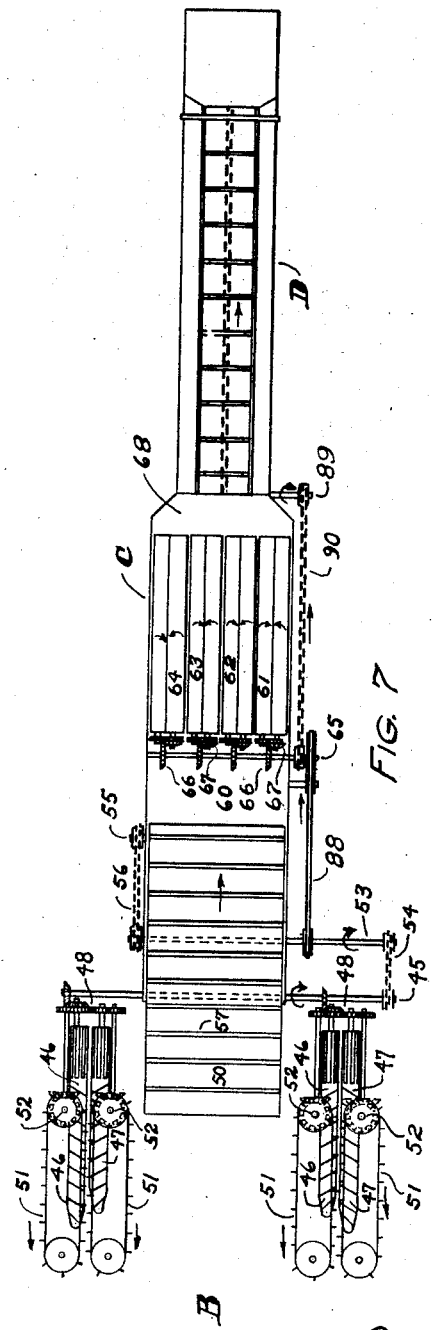
INVENTOR.
CHARLES E. EVERETT
BY
ATTORNEY Patented June 29, 1943

2,323,087

UNITED STATES PATENT OFFICE 2,323,087

SELF-PROPELLED CORN HARVESTER

Charles E. Everett, Racine, Wis., assignor to The Massey-Harris Company, Racine, Wis., a company of Maryland Application August 14, 1942, Serial No. 454,807

4 Claims. (Cl. 56—18)

The present invention relates to a self propelled two row corn harvester wherein the device is guided and controlled by the operator similar to an automobile, truck or tractor and wherein the driving wheels are in front and adapted to straddle the two rows of corn being harvested and the guiding wheels are in the rear and adapted to travel between the rows being harvested.

An important feature of my invention is the snapping rolls having gathering means which extend transversely over the driving wheels far enough to protect these wheels from the corn stalks.

An object of the present invention is to provide a corn harvester which operates on the straight through principle; that is, the snapping rolls, elevator, shucking rolls and final elevator are each mounted in substantial longitudinal alignment.

A further object of my invention is to provide a unitary chassis or frame upon which the operating units may be detachably mounted similar to that shown in my coopending application Serial No. 438,494, filed April 10, 1942, Self propelled combine harvester, now Patent No. 2,310,577, granted February 9, 1943.

A still further object of my invention is to provide an operator's platform which is positioned adjacent one side of the rear end of the first elevator and high enough so the operator will have a full view of the operation of the gathering means, snapping rolls, first elevator, shucking rolls and the final elevator.

An object of the present invention is to position the wheels and the operating units of the device whereby the weight is suitably distributed.

Another object of my invention is to provide suitable controlling means on the operator's platform whereby the operator can conveniently guide and control the device.

A further object of my invention is to provide a supplemental frame on which I mount the engine and in a position so the space occupied by the frame is not otherwise needed.

To these and other useful ends, my invention consists of parts, combinations of parts, or their equivalents, and mode of operation, as hereinafter set forth and claimed and shown in the accompanying drawings in which:

Fig. 1 is a right side elevational view of my complete corn harvester.

Fig. 2 is a left side elevational view of the harvester shown in Figure 1.

Fig. 3 is a front view of the harvester shown in Figures 1 and 2.

Fig. 4 is a rear view of the harvester.

Fig. 7 is a diagrammatic top view of the operating parts of my corn harvester.

Figure 5:
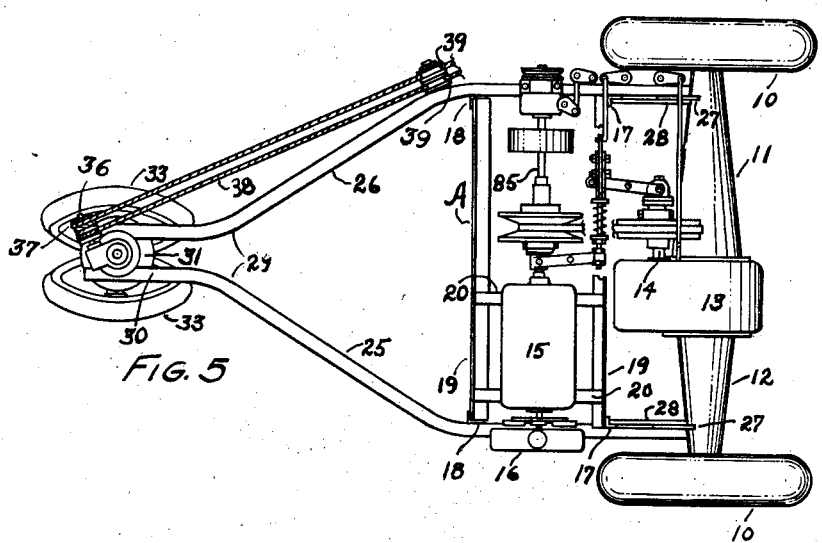
Fig. 5 is a top view of the chassis illustrating the engine and driving wheel axle housing and one form of an operating connection between the engine shaft and the housing gear.

I will now describe the chassis of my device. As illustrated, numerals 10—10 designate the driving wheels of my device which are preferably rubber tired as illustrated. Numerals 11 and 12 designate the axle housing which is equipped with the differential and transmission housing 13 having suitable transmission gears operatively connected to the differential and being driven by shaft 14 which is suitably connected to an engine 15, the engine being equipped with a coolant radiator 16.

Engine 15 is preferably mounted on the supplemental frame, the frame comprising front posts 17—17 and rear posts 18—18, the pairs of posts being connected together by means of transverse bars 19—19, the engine being mounted on bars 19 preferably by means of supporting brackets 20 somewhat similar to the mounting of an automobile engine.

The supplemental frame is mounted on the main frame as illustrated a short distance in rear of the axle housings 11 and 12 and transmission housing 13, this main frame comprising right and left hand frame bars 25 and 26, the front ends of which are secured to axle housings 11 and 12 by means of brackets 27—27.

In the drawings, I have designated the supplemental frame in its entirety by reference character A. In order to stiffen this frame and make it suitable for supporting the major part of the harvester, I provide braces 28—28 which extend rearwardly and upwardly from brackets 27 to posts 17.

Figure 6:
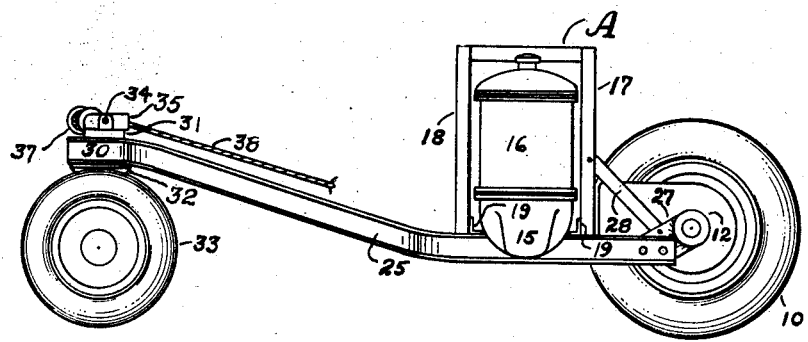
Fig. 6 is a right side elevational view of the chassis illustrated in Figure 5.

Members 25 and 26 converge from frame A to points as at 29. These members extend upwardly and rearwardly as illustrated in Figure 6. The rear ends are bent so they are horizontal as at 30. These rear ends are secured to a caster bracket 31 into which a guiding wheel bracket 32 is pivoted (see Figure 4). Guiding wheels 33—33 are rotatably mounted on the lower end of bracket 32.

The trunnion which extends through bracket 31 is, at its upper end, provided with a worm gear (not shown) having a worm pinion (not shown) mounted on a shaft 34, the shaft being rotatably mounted in a housing 35; thus shaft 34 may be turned for guiding wheels 33. Shaft 34 protrudes a distance as at 36 and having mounted thereon a flanged sleeve 37 around which cable 38 is wound. The cables extend forwardly and under rotatably mounted sheaves 39—39, the forward ends of the cables then extend upwardly and to the steering mechanism as will hereinafter appear so that when the steering mechanism is operated, sheave 37 will act to guide wheels 33.

My improved corn harvester includes two pairs of snapping rolls suitably mounted in a forwardly and downwardly extending frame having gathering means. This assembly in its entirety is designated by reference character B. I provide a shucking unit which in its entirety is designated by reference character C. The final corn elevator is designed in its entirety by reference character D.

Member C is rigidly secured to the frame of the chassis in the relative position shown in the figures. The rear end of member B is hingedly mounted preferably in axial alignment with a snapping roll driving shaft 45.

Suitable means (not shown) are provided which extend from member B forward of member 45 to the operator's platform whereby the forward end of member B may be raised and lowered in a manner which is too well known to require further description.

Member B is provided with two pairs of snapping rolls, the right hand roll of each pair being designated by numeral 46 and the left hand roll being designated by numeral 47.

Rolls 46 and 47 are directly or indirectly operatively connected to shaft 45 by a train of gears as at 48—48. Shaft 45 turns in the direction indicated by curvilinear arrows in Figure 7 so the adjacent sides of the rolls move downwardly, the rolls being positioned close enough together so the stalks will be tightly contacted and permitted to pass downwardly between the rolls whereby the ears are snapped or broken from the stalks. Guiding means 49 are provided whereby the ears will move inwardly as indicated by arrows on an endless elevator which is designated by numeral 50 in a manner too well known to require further description.

In order to force the corn stalks into the snapping rolls and guide them rearwardly, the usual spiked sprocket chains 51 are provided, the chains winding around sprockets on driving shafts 52, these shafts having operating connections to the train of gears 48.

It will be seen that the pairs of rolls will act to remove the ears with their husks from the stalks and that the gathering means will act to guide the stalks into the chains and rolls. Elevator 50 is driven by means of an intermediate shaft 53 with suitable sprockets and a chain 54 to shaft 45. The drive shaft 55 of elevator 50 is operatively connected to shaft 53 by means of suitable sprockets and a chain 56. Elevator 50 is of the endless type having suitable cross slats 57.

The snapped ears are elevated and delivered to a trough 60 which is adapted to deliver the corn to the forward end of unit C.

Unit C comprises preferably four pairs of shucking rolls, the pairs being designated in Figure 7 by numerals 61, 62, 63, and 64, the pairs of rolls being driven so the adjacent edges turn downwardly. This is accomplished in a well known manner by means of a driving shaft 65, bevel gears 66 and pinions 67, one pinion for each pair of rolls. The other roll of each pair receives its power from the driven roll through gears so the rolls may be spring held together in a manner too well known to require further description. It will be seen that I have provided means whereby the ears will pass by gravity or otherwise over the rolls of unit C, the rear ends of the rolls being somewhat lower than their front ends. The husks are removed from the ears and the ears are delivered to elevator D through a gathering and guiding pan 68 (see Figures 4 and 7).

Generally a wagon is hitched to the rear end of the harvester, the ears being delivered to the wagon box by unit D or other carrying means as is well known.

No novelty is claimed in the present application for units B, C and D when taken separately each of which has been in use in one form or another in draw bar or horse pulled corn harvesters. The invention resides in the combination of these parts when associated with the chassis, the power unit and the operator's platform.

I provide an operator's platform, the floor of which is designated by reference numeral 75 having suitable railings, as illustrated, and a ladder formed by side bars 76—76 and spaced rungs 77 whereby the operator may easily climb to the platform. The platform is provided with an operator's seat 78. A post 79 having a steering wheel 80 is provided, the steering wheel having operating connections to cable 38 so the operator may guide the harvester as already described.

Either hydraulic or manually operated means (not shown) are provided for raising and lowering the front ends of member B from the driver's seat and means (not shown) are provided for controlling the operating parts of the harvester from the driver's seat.

It will be seen by referring to Figures 2, 3 and 4 that the operator will be in a position where he can observe the operation of the gathering means, snapping rolls, the primary elevator, the husking rolls and the final elevator, also giving him a perfect view of the approaching stalks of corn being harvested.

The specific manner of making the power connections from the engine to the various operating parts of the device are optional. A general idea of the preferred plan is shown in Figures 2 and 5 wherein the engine shaft is designated by reference numeral 85 and the main driving shaft is designated by numeral 53. I have illustrated a belt 87 having a tightener for making power connection between these two shafts so all of the operated parts may be started and stopped at will.

Shaft 65 is operatively connected to shaft 53 preferably by means of a belt or chain 88. A shaft 89 carries the lower end of the elevator apron in member D and this shaft preferably receives its power from shaft 65 by means of a belt or chain 90.

I have illustrated a V-belt connection between shafts 14 and 85 which, in addition to the transmission, provides means for changing the ratio between these shafts and for making and breaking the connections clutch-like. This V-belt mechanism is illustrated and described in a pending application Serial No. 419,876, filed November 21, 1941, Charles V. Everett. The controlling connections between the operating parts which lead to the platform may be similar to that shown in my coopending application referred to in the preamble of this specification.

By observing Figures 1 and 2 it will be seen that space otherwise wasted may be utilized in which to position the power unit and transmission mechanism; that the weight is suitably distributed on the carrying and driving wheels; that units B, C and D and intervening parts are easily attached to the chassis and to the supplemental frame shown in Figures 5 and 6 and that the chassis is suitably designed as to strength for the purpose.

My machine, as shown, is designed for right hand operation. That is the last two rows in a field are harvested with the standing rows on the right. In order to prevent the standing corn from falling into the front right hand driving wheel, I provide an extension plate 92 which is suitably secured to the upper edge of the right hand gathering board of member B.

Having thus shown and described my invention, I claim:

1. A two row corn harvester of the class described, comprising a unitary chassis frame having at its front end carrying and driving wheels adapted to travel on opposite sides of the rows of corn being harvested and having at its rear end carrying and guiding means adapted to travel between the rows being harvested, two pairs of snapping rolls having gathering means, said gathering means extending transversely past the longitudinal plane of said driving wheels, a vertically extending supplemental frame mounted on said chassis frame, a power unit mounted on said supplemental frame in rear of and adjacent the axis of said driving wheels and having operating connections thereto, a transversely centrally positioned longitudinally arranged elevator adapted to receive the ears of corn from said snapping rolls and being extended upwardly and rearwardly terminating at a point above the top of said power unit, a shucking unit mounted longitudinally in rear of said power unit, means for directing the ears of corn from said elevator into the front end of said shucking unit.

2. A two row corn harvester of the class described, comprising a unitary chassis frame having at its front end carrying and driving wheels adapted to travel on opposite sides of the rows of corn being harvested and having at its rear end carrying and guiding means adapted to travel between the rows being harvested, two pairs of snapping rolls having gathering means, said gathering means extending transversely past the longitudinal plane of said driving wheels, a vertically extending supplemental frame mounted on said chassis frame, a power unit mounted on said supplemental frame in rear of and adjacent the axis of said driving wheels and having an operating connection thereto, a transversely centrally positioned longitudinally arranged elevator adapted to receive the ears of corn from said snapping rolls and extending upwardly and rearwardly terminating at a point above said power unit, a shucking unit mounted longitudinally in rear of said power unit, means for directing the ears of corn from said elevator into the front end of said shucking unit, a longitudinally positioned elevator in rear of said shucking unit, its front end being adapted to receive the corn from the rear end of said shucking unit and its rear end being adapted to deliver the corn to a traveling receptacle.

3. A self propelled two-row corn harvester of the class described, comprising in combination a chassis frame having side members and an axle housing mounted on the forward ends thereof, said housing having axles, carrying and driving wheels and a differential, guiding and carrying wheels mounted on the rear end of said chassis, a vertically extending supplemental frame secured to the forward ends of said side members, an engine mounted within said supplemental frame and positioned a short distance in rear of said axle housing and having an operating connection to said differential, two spaced pairs of snapping rolls, their rear ends being positioned between the vertical plane of the inside edges of said carrying and driving wheels and having gathering means, a longitudinally centrally positioned elevator, the forward end being positioned between the rear ends of said pairs of snapping rolls and being adapted to receive the ears of corn therefrom, said elevator extending upwardly and rearwardly, said snapping rolls, gathering means and elevator being mounted on the forward end of said supplemental frame, a longitudinally arranged shucking unit secured to said chassis frame and in rear of the delivery end of said elevator, means adapted to deliver the ears of corn from the elevator on the forward end of said shucking unit by gravity, operating connections from said engine to said snapping rolls, elevator and shucking unit, an operator's platform positioned adjacent one side of the rear end of said elevator and at a height whereby the operator can view the operation of the gathering means, snapping rolls, elevator and shucking unit, means on said platform having an operating connection with said guiding and carrying wheels, means mounted on said platform associated with said last engine operating connection, whereby the operator, from his position on the platform, may control all of the operating parts of the harvester.

4. A self propelled two-row corn harvester of the class described, comprising in combination a chassis frame having side members and an axle housing mounted on the forward ends thereof, said housing having axles, carrying and driving wheels and a differential, guiding and carrying means mounted on the rear end of said chassis frame, a vertically extending supplemental frame secured to the forward ends on said side members, an engine mounted on said supplemental frame and positioned a short distance in rear of said axle housing and having an opening connection to said differential, unitary snapping and elevating means mounted on said chassis frame and being positioned between the vertical planes of said driving wheels, a longitudinally arranged shucking unit secured to said chassis frame in rear of said engine and in rear of and below the delivery end of said elevator, means adapted to deliver the ears from said elevator into the forward end of said shucking unit by gravity, operating connections from said engine to said snapping rolls, elevator and shucking unit, an operator's seat positioned adjacent one side of the rear end of said elevator and at a height whereby the operator can view the operation of the snapping rolls, elevator and shucking unit, gathering means associated with said snapping rolls with the outer edges overhanging said carrying and driving wheels, and means within reach of the operator whereby he may guide the device and control the operating connections of said engine to the operating parts of the harvester.

CHARLES E. EVERETT.